US011184871B2

(12) United States Patent
Paul et al.

(10) Patent No.: US 11,184,871 B2
(45) Date of Patent: Nov. 23, 2021

(54) SYSTEMS AND METHODS FOR TIME COORDINATING A PLURALITY OF RF DATA COLLECTION DEVICES AT DISPARATE LOCATIONS

(71) Applicant: PC-TEL, Inc., Bloomingdale, IL (US)

(72) Inventors: Sumeet Singh Paul, Evanston, IL (US); Stephen V. Saliga, Akron, OH (US); David Adams, Gaithersburg, MD (US)

(73) Assignee: PCTEL, Inc., Bloomingdale, IL (US)

( * ) Notice: Subject to any disclaimer, the term of this patent is extended or adjusted under 35 U.S.C. 154(b) by 12 days.

(21) Appl. No.: 16/987,063

(22) Filed: Aug. 6, 2020

(65) Prior Publication Data

US 2021/0045080 A1 Feb. 11, 2021

Related U.S. Application Data

(60) Provisional application No. 62/884,519, filed on Aug. 8, 2019.

(51) Int. Cl.
*H04J 3/06* (2006.01)
*H04W 24/08* (2009.01)
*H04W 24/10* (2009.01)
*H04W 56/00* (2009.01)

(52) U.S. Cl.
CPC ....... *H04W 56/0015* (2013.01); *H04J 3/0638* (2013.01); *H04J 3/0667* (2013.01); *H04W 24/08* (2013.01); *H04W 24/10* (2013.01); *H04W 56/003* (2013.01)

(58) Field of Classification Search
CPC ...... H04B 17/0082–3913; H04J 3/0635–0697; H04L 7/0004–10; H04L 43/02–50; H04W 24/02–10; H04W 56/0005–0095
See application file for complete search history.

(56) References Cited

U.S. PATENT DOCUMENTS

| 2007/0178842 A1 | 8/2007 | Ii |
| 2012/0263165 A1 | 10/2012 | Zakrzewski et al. |
| 2012/0311136 A1 | 12/2012 | Shafi et al. |

OTHER PUBLICATIONS

Extended European search report for corresponding EP patent application 20190086.7, dated Dec. 15, 2020.

*Primary Examiner* — Timothy J Weidner
(74) *Attorney, Agent, or Firm* — Husch Blackwell LLP

(57) ABSTRACT

Systems and methods for time coordinating a plurality of RF data collection devices at disparate locations are provided. Such systems and methods can include synchronizing a local time of a first RF data collection device to an initial value of a common time source, generating a timestamp log file documenting a propensity of the local time to deviate from the common time source, collecting and recording a first plurality of RF data from an RF network, and using the timestamp log file to normalize the first plurality of RF data for comparison with a second plurality RF data recorded by a second RF data collection device.

20 Claims, 3 Drawing Sheets

SYSTEMS AND METHODS FOR TIME COORDINATING A PLURALITY OF RF DATA COLLECTION DEVICES AT DISPARATE LOCATIONS

CROSS REFERENCE TO RELATED APPLICATIONS

This application claims priority to U.S. Application No. 62/884,519 filed Aug. 8, 2019 and titled "SYSTEMS AND METHODS FOR TIME COORDINATING A PLURALITY OF RF DATA COLLECTION DEVICES AT DISPARATE LOCATIONS." U.S. Application No. 62/884,519 is hereby fully incorporated by reference as if set forth fully herein.

FIELD

The present invention relates generally to radio frequency (RF) data collection devices. More particularly, the present invention relates to systems and methods for time coordinating a plurality of RF data collection devices at disparate locations.

BACKGROUND

When measuring RF transmission systems, uplink transmissions (i.e. from user equipment device, such as a user endpoint device or handset, to a base station) and downlink transmissions (i.e. from the base station to the user equipment device) are both important. However, systems and methods to simultaneously collect measurements of both the uplink transmissions and the downlink transmissions require scanning equipment at two locations: the user equipment device and the base station. Furthermore, such systems require that the measurements of the uplink transmissions and the downlink transmissions be aligned to reflect information with a shared time stamp. Unfortunately, in most cases, there is no shared network or data connection available between the user equipment device and the base station, thereby limiting time stamp coordination.

Known systems and methods to address the above-identified challenges are manual and work in connection with a single base station in one location and a plurality of user equipment devices in second, different locations. For example, known systems and methods collect first data at the base station using internal data generated by the base station and, during post processing, occasionally or periodically compare that first data to second data collected at any of the plurality of user equipment devices. Accordingly, such systems and methods rely on self-reporting from hardware at the base station and do not use any independent RF scanning equipment. As such, there is no easy way to coordinate the first data with the second data. Indeed, to coordinate the first data with the second data, some known systems and methods require recording the first data at the base station for an abnormally long period of time (e.g. all day) and matching time stamps of the first data with time stamps of the second data that was recorded at any of the plurality of user equipment devices during a smaller period of time (e.g. a few hours). Furthermore, despite such a complicated coordination of manual data, known systems and methods still give engineers a limited picture of the uplink transmissions and the downlink transmissions.

In view of the above, there is a continuing, ongoing need for improved systems and methods.

DETAILED DESCRIPTION

Figure 1:
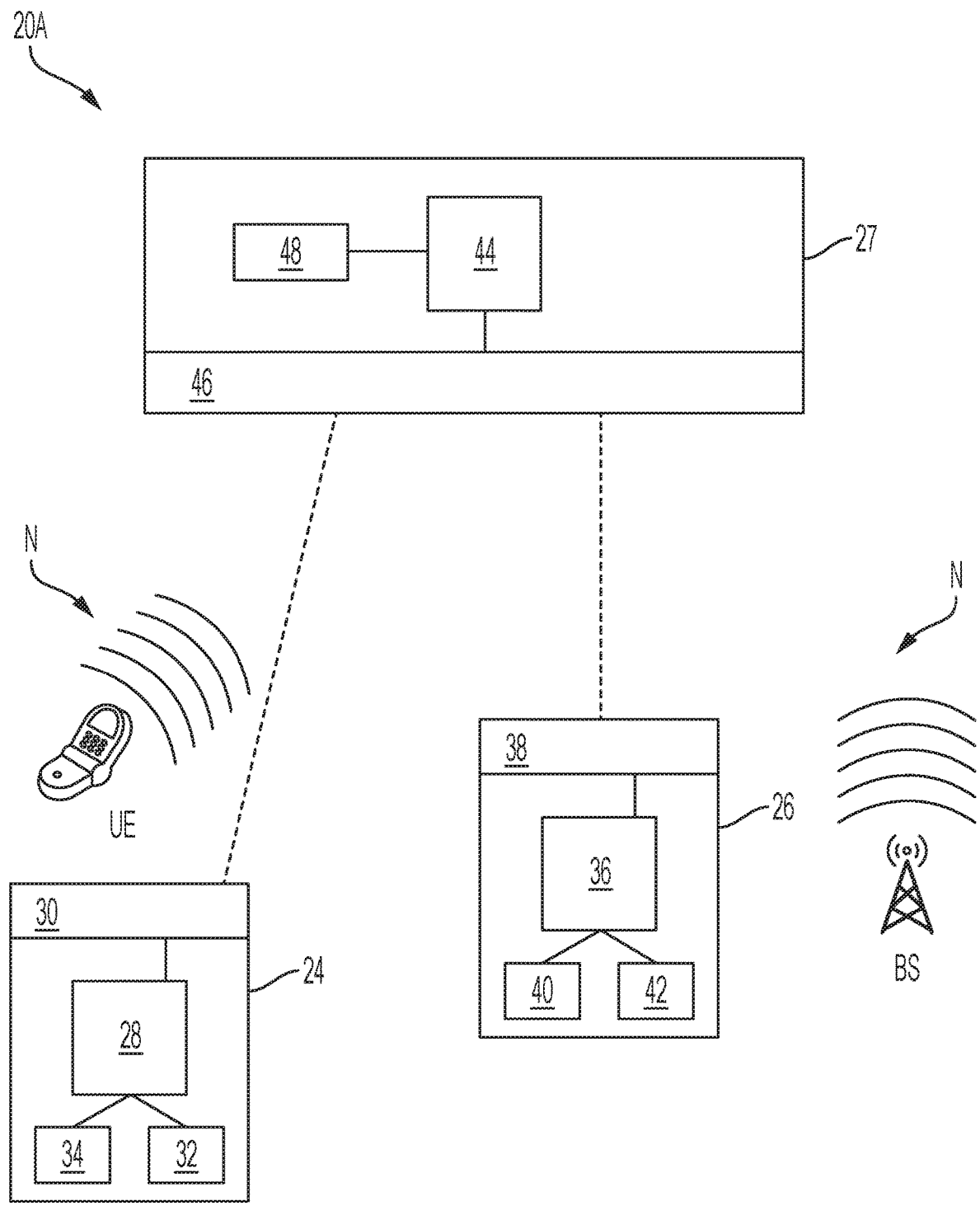
FIG. 1 is block diagram of a system according to disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for time coordinating a plurality of RF data collection devices at disparate locations. In particular, the plurality of RF data collection devices can record collected data using an effectively shared time stamp and coordinate events, such as control logic, without a need for a shared network or data connection.

It is to be understood that each of the plurality of RF data collection devices disclosed and described herein can include a respective piece of scanning equipment. It is also to be understood that any of the plurality of the RF data collection devices disclosed and described herein can include one or more base stations or one or more of a plurality of user equipment devices.

In accordance with disclosed embodiments, all of the plurality of RF data collection devices can be configured with the same settings. For example, those settings can identify which RF network to monitor for timing information and can define a series of repeating data recording events. In some embodiments, the RF network to monitor can include a 4G LTE network at a specific frequency or any other network that is not otherwise being monitored for timing for other purposes. Furthermore, in some embodiments, the series of repeating data recording events can identify one or more triggers and one or more time periods.

In operation, the respective piece of scanning equipment of each of the plurality of RF data collection devices can lock on the RF network to monitor, record the collected data responsive to a respective one of the plurality of RF data collection devices identifying one of the triggers for a length of time equal to a first of the time periods, and reset every length of time equal to a second of the time periods. As a specific, but non-limiting example, the respective piece of scanning equipment of each of the plurality of RF data collection devices can lock on the 4G LTE network at a first frequency, switch to a next frequency to test every 150 ms (i.e. one of the triggers), record the collected data on the next frequency to test for 50 ms (i.e. the first of the time periods), and reset every 2000 ms (i.e. the second of the time periods).

In accordance with disclosed embodiments, each of the plurality of RF data collection devices can communicate with a shared NTP server to set a respective time stamp to a common clock, thereby achieving the benefit of a shared time stamp without the shared network or data connection and even though each of the plurality of RF data collection devices uses its own respective time stamp to record the collected data.

In accordance with the above, a single one of the plurality of user equipment devices can be tested against two or more of the base stations. Similarly, more than one of the plurality of user equipment devices can be tested against two or more of the base stations.

FIG. 1 is a block diagram of a system 20A in accordance with disclosed embodiments. As seen in FIG. 1, in some embodiments, the system 20A can include a first RF data collection device 24, a second RF collection device 26, a network time server 27, a base station BS that can generate an RF network N, and user equipment UE that can connect to the RF network N. In some embodiments, the first RF collection device 24 can include a first programmable processor 28, a first RF transceiver device 30, a first memory device 32, and a first internal clock 34 that can manage a first local time for the first RF transceiver device 24. Similarly, in some embodiments, the second RF device 26 can include a second programmable processor 36, a second RF transceiver device 38, a second memory device 40, and a second internal clock 42 that can manage a second local time for the second RF transceiver device 26. Additionally, in some embodiments, the network time server 27 can include a third programmable processor 44, a third RF transceiver device 46, and a third internal clock 48 that can act as a common time source for the first RF data collection device 24 and the second RF data collection device 26.

In some embodiments, the first RF data collection device 24 can collect and record a first plurality of RF data from the RF network N. For example, in some embodiments, the first RF transceiver device 30 can receive the first plurality of RF data from the RF network N when located proximate to the base station BS or the user equipment UE, and in some embodiments, the first programmable processor 24 can record the first plurality of RF data in the first memory device 32. As such, in some embodiments, the first plurality of RF data can include first values of the first local time at which corresponding first RF signal components are recorded in the first memory device 32.

In some embodiments, the first plurality of RF data can be compared to and/or coordinated with a second plurality RF data collected and recorded by the second RF data collection device 26. However, to enable proper comparison and coordination of the first plurality of RF data and the second plurality of RF data when the first RF data collection device 24 and/or the second RF data collection device 26 have independent network connectivity and/or no network connectivity when the first plurality of RF data and/or the second plurality of RF data are collected, the first local time can be coordinated with the second local time.

For example, in some embodiments, the first programmable processor 28 can synchronize the first local time to an initial value of the common time source. Following such synchronization, the first programmable processor 28 can generate a first timestamp log file documenting a propensity of the first local time to deviate from the common time source and save the first timestamp log file in the first memory device 32. Then, after the first plurality of RF data is collected, the first timestamp log file can be used to normalize the first values of the first local time to corresponding values of the common time source for comparison and coordination with the second plurality of RF data.

For example, in some embodiments, the first RF data collection device 24 can connect to the network time server 27 via the first RF transceiver 30 and the third RF transceiver device 46 using a network time protocol to synchronize the first local time to the common time source. In some embodiments, following such synchronization, the first RF data collection device 24 can periodically connect to the network time server 27 to compare a current value of the first local time to a current value of the common time source, and when the current value of the first local time fails to match the current value of the common time source, the first programmable processor 28 can add an entry to the first timestamp log file that records offset amounts between the current value of the first local time and the current value of the common time source and subsequently increase a rate at which the first RF data collection device 24 periodically connects to the network time server 27. In some embodiments, the rate can be doubled (e.g. from every hour to every 30 minutes).

Similarly, in some embodiments, the second RF transceiver device 38 can receive the second plurality of RF data from the RF network when located proximate to the base station BS or the user equipment UE, and in some embodiments, the second programmable processor 36 can record the second plurality of RF data in the second memory device 40. As such, in some embodiments, the second plurality of RF data can include second values of the second local time at which the corresponding second RF signal components are recorded in the second memory device 40.

As explained above, the second plurality of RF data can be compared to and/or coordinated with the first plurality RF data collected. However, to enable proper comparison and coordination of the first plurality of RF data and the second plurality of RF data when the first RF data collection device 24 and/or the second RF data collection device 26 have independent network connectivity and/or no network connectivity when the first plurality of RF data and/or the second plurality of RF data are collected, the second local time can be coordinated with the first local time.

For example, in some embodiments, the second programmable processor 36 can synchronize the second local time to the initial value of the common time source. Following such synchronization, the second programmable processor 36 can generate a second timestamp log file documenting a propensity of the second local time to deviate from the common time source and save the second timestamp log file in the second memory device 40. Then, after the second plurality of RF data is collected, the second timestamp log file can be used to normalize the second values of the second local time to the corresponding values of the common time source for comparison and coordination with the first plurality of RF data.

For example, in some embodiments, the second RF data collection device 26 can connect to the network time server 27 via the second RF transceiver device 38 and the third RF transceiver device 46 using the network time protocol to synchronize the second local time to the common time source. In some embodiments, following such synchronization, the second RF data collection device 26 can periodically connect to the network time server 27 to compare a current value of the second local time to the current value of the common time source, and when the current value of the second local time fails to match the current value of the common time source, the second programmable processor 36 can add an entry to the second timestamp log file that records offset amounts between the current value of the second local time and the current value of the common time source and subsequently increase a rate at which the second RF data collection device 26 periodically connects to the network time server 27.

In some embodiments, the first programmable processor 28 and/or the second programmable processor 36 can normalize the first plurality of RF data and/or the second plurality of RF data before export that data from the first RF data collection device 24 and the second RF data collection device 26, respectively. However, in some embodiments, the first RF data collection device 24 and/or the second RF data collection device 26 can export the first timestamp log file and/or the second time stamp log file with the first plurality of RF data and the second plurality of RF data, respectively, so that another device, such as the third programmable processor 44 can normalize the first plurality of RF data and/or the second plurality of RF data for comparison and coordination thereof.

In some embodiments, the first timestamp log file can be used to normalize the first values of the first local time to the corresponding values of the common time source for comparison with the second plurality RF data by calculating time offsets for each interval period at which the corresponding first RF signal components are recorded using a linear average of the offset amounts recorded in the first timestamp log file for an adjustable elapsed time period. Similarly, in some embodiments, the second timestamp log file can be used to normalize the second values of the second local time to the corresponding values of the common time source for comparison with the first plurality RF data by calculating time offsets for each interval period at which the corresponding second RF signal components are recorded using a linear average of the offset amounts recorded in the second timestamp log file for the adjustable elapsed time period. As a specific, but non-limiting example, if the first timestamp log file and/or the second timestamp log file has a linear average of the offset amounts recorded of 6 milliseconds for a 60 second time period, and the first plurality of RF data and/or the second plurality of RF data includes 1000 pieces of data recorded every 60 seconds, then the first plurality of RF data and/or the second plurality of RF data can be normalized by adjusting the first value of the first local time and/or the second value of the second local time by $6/1000$ milliseconds.

In some embodiments, the first RF data collection device 24 and/or the second RF data collection device 26 can receive a meta data collection file that includes configuration information for the RF network N and an identification of the network time server 27. In these embodiments, the first RF data collection device 24 and/or the second RF data collection device 26 can identify the network time server 27 from the meta data collection file and use the configuration information to collect and record the first plurality of RF data and/or the second plurality of RF data, respectively. In some embodiments, the configuration information for the RF network N can include frequencies, bands, or channels of the RF network N, a recording bandwidth, and/or a recording data rate.

Figure 2:
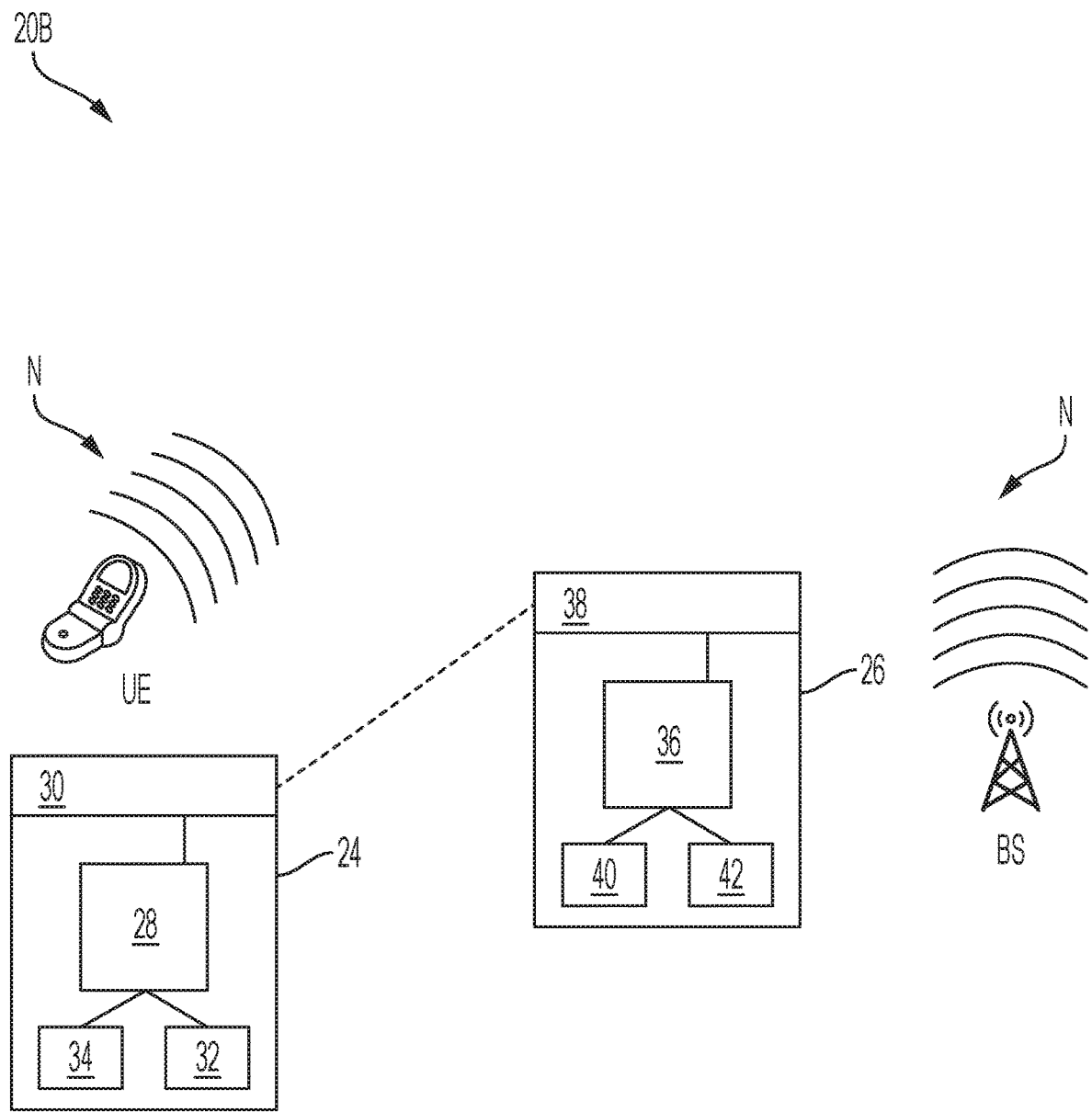
FIG. 2 is a block diagram of a system according to disclosed embodiments.

FIG. 2 is a block diagram of a system 20B in accordance with disclosed embodiments. As seen in FIG. 2, in some embodiments, the system 20B can include the first RF data collection device 24, the second RF data collection device 26, the user equipment UE, and the base station BS while omitting the network time server 27. In these embodiments, the first local time and the second local time can be synchronized by using one of the first local time and the second local time as the common time source, for example, when there is no physical network access and any RF data from the RF network N is retrieved manually through direct access by a device at the base station BS or the user equipment UE, such as via a USB stick or similar removal storage device.

In embodiments in which the second local time is the common time source, the first RF data collection device 24 can connect to the second RF data collection device 26 via the first RF transceiver device 30 connecting to the second RF transceiver device 38, and the first programmable processor 28 can receive the initial value of the common time source (i.e. the second local time) from the second local clock 42. Then, the first RF data collection device 24 can maintain such a connection with the second RF collection device 26 for a predetermined time period and periodically compare the current value of the first local time to the current value of the common time source during the predetermined time period. Then, when the current value of the first local time fails to match the current value of the common time source, the first programmable processor 28 can record offset amounts therebetween in the first timestamp log file. As a specific, but non-limiting example, the first RF data collection device 24 can stay connected to the second RF data collection device 26 for 120 seconds while validating the current value of the first local time every 15 seconds to create the first timestamp log file as described herein.

In some embodiments, the first RF data collection device 24 can pair with the second RF data collection device 26 via a Bluetooth connection to receive the initial value of the common time source from the second RF data collection device 26. For example, in these embodiments, the second programmable processor 36 can select the first RF data collection device 24 from a list of paired devices, and responsive to such a selection, the second RF collection device can transmit the initial value of the common time source to the first RF data collection device 24 via the second RF transceiver device 38 and the first RF transceiver device 30. Furthermore, while paired, the first RF data collection device 24 can periodically receive the current value of the common time source from the second RF data collection device 26.

Figure 3:
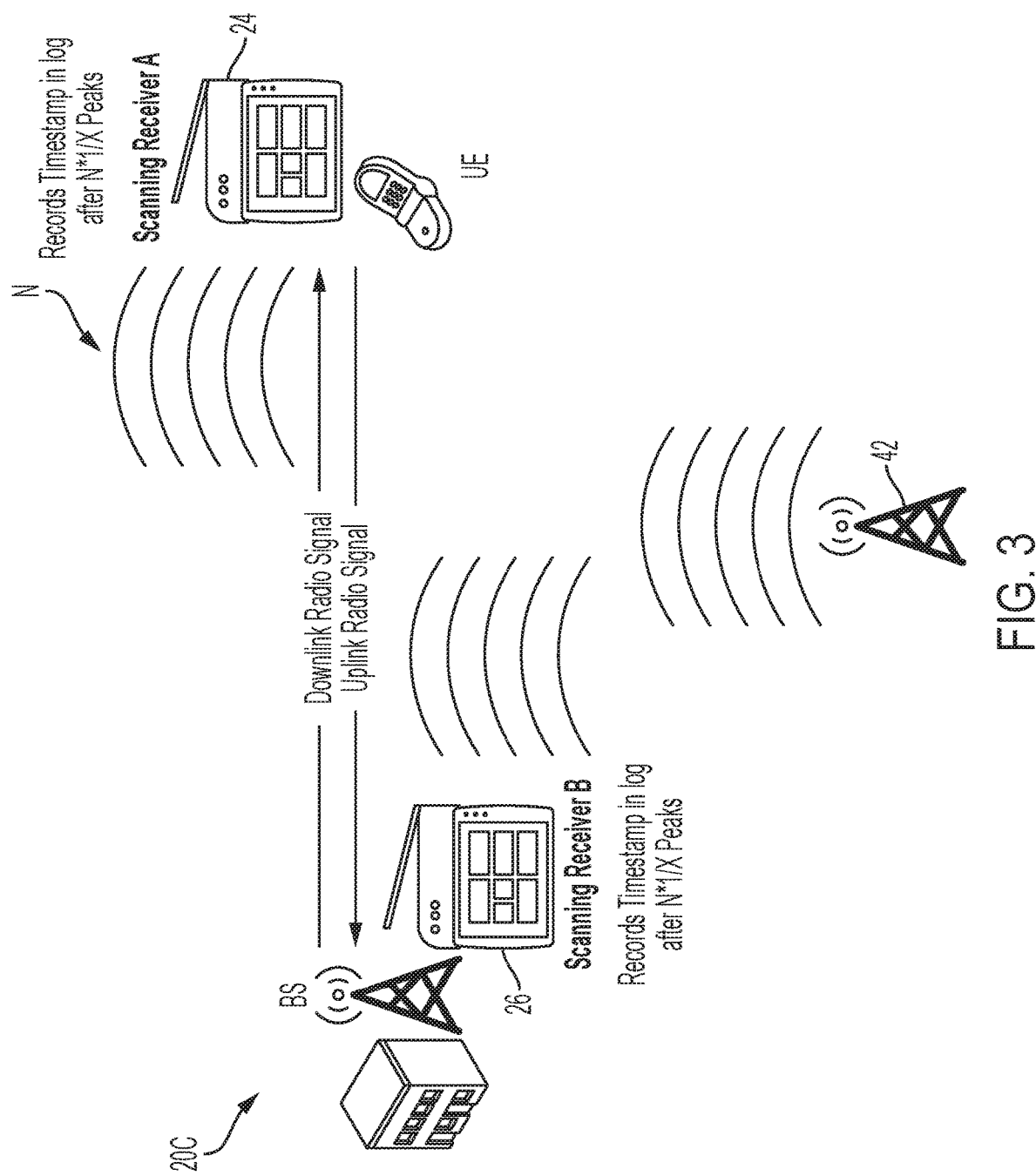
FIG. 3 is a block diagram of a system according to disclosed embodiments.

FIG. 3 is a block diagram of a system 20C according to disclosed embodiments. As seen in FIG. 3, in some embodiments, the system 20C can include the first RF data collection device 24, the second RF data collection device 26, the user equipment UE, the base station BS, and a second station 42 that can broadcast a local broadcast signal in proximity to the base station BS and the user equipment UE. In these embodiments, the first RF data collection device 24 and/or the second RF data collection device 26 can use properties of the local broadcast signal to generate the first timestamp log file and the second timestamp log file, respectively. In some embodiments, the local broadcast signal can include a 650 KHz AM radio signal.

For example, in some embodiments, the first RF data collection device 24 and/or the second RF data collection device 26 can select a timing frequency for collecting the first plurality of RF data and/or the second plurality of RF data, respectively, using a simple amplitude modulation of the local broadcast signal. In these embodiments, the first RF data collection device 24 and/or the second RF data collection device 26 can monitor the timing frequency, count peaks of the local broadcast signal, and generate the first timestamp log file and/or the second timestamp log file, respectively, by recording the current value of the first local time and/or the second local time after N*1/X peaks of the local broadcast signal, where X is the timing frequency and N is a preconfigured multiplier selected to limit an impact of recording the current value of the first local time and/or the current value of the second local time. As such, in these embodiments, the first timestamp log file and/or the second timestamp log file can include an effective peak count log of the timing frequency monitored.

In some embodiments, additional RF data collection devices similar to the first RF data collection device 24 and the second RF data collection device 26 can be included in any of the systems 20A, 20B, and 20C as described herein. For example, in the system 20A, any of the additional RF data collection devices can synchronize its respective local time with the network time server 27 as described herein. In the system 20B, any of the additional RF data collection devices can synchronize its respective local time with the second local time of the second RF data collection device 24. Finally, in the system 20C, any of the additional RF data collection devices can use the properties of the local broadcast signal to synchronize its respective local time.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   synchronizing a first local time of a first RF data collection device to an initial value of a common time source;
   generating a first timestamp log file at the first RF data collection device, the first timestamp log file documenting a propensity of the first local time to deviate from the common time source;
   saving the first timestamp log file in a first memory device of the first RF data collection device;
   collecting and recording a first plurality of RF data from an RF network in the first memory device, the first plurality of RF data including first values of the first local time at which corresponding first RF signal components are recorded;
   using the first timestamp log file to normalize the first values of the first local time to corresponding values of the common time source for comparison with a second plurality RF data recorded by a second RF data collection device.

2. The method of claim 1 further comprising:
   connecting the first RF data collection device to a network time server using a network time protocol to synchronize the first local time to the common time source, the network time server managing the common time source;
   periodically connecting the first RF data collection device to the network time server to compare a current value of the first local time to a current value of the common time source; and
   when the current value of the first local time fails to match the current value of the common time source, adding an entry to the first timestamp log file that records offset amounts between the current value of the first local time and the current value of the common time source in the first timestamp log file and increasing a rate at which the first RF data collection device periodically connects to the network time server.

3. The method of claim 2 further comprising:
   calculating time offsets for each interval period at which the corresponding first RF signal components are recorded using a linear average of the offset amounts recorded in the first timestamp log file for an adjustable elapsed time period.

4. The method of claim 2 further comprising:
   receiving a meta data collection file at the first RF data collection device, the meta data file including configuration information for the RF network and an identification of the network time server;
   identifying the network time server from the meta data collection file; and
   using the configuration information to collect and record the first plurality of RF data.

5. The method of claim 4 wherein the configuration information includes frequencies, bands, or channels of the RF network, a recording bandwidth, or a recording data rate.

6. The method of claim 2 further comprising:
   synchronizing a second local time of the second RF data collection device to the initial value of the common time source;
   generating a second timestamp log file at the second RF data collection device, the second timestamp log file documenting a propensity of the second local time to deviate from the common time source;
   saving the second timestamp log file in a second memory device of the second RF data collection device;
   collecting and recording the second plurality of RF data from the RF network in the second memory device, the second plurality of RF data including second values of the second local time at which corresponding second RF signal values are recorded;
   connecting the second RF data collection device to the network time server using the network time protocol to synchronize the second local time to the common time source;
   periodically connecting the second RF data collection device to the network time server to compare a current value of the second local time to the current value of the common time source;
   when the current value of the second local time fails to match the current value of the common time source, adding an entry to the second timestamp log file that records offset amounts between the current value of the second local time and the current value of the common time source and increasing a rate at which the second RF data collection device periodically connects to the network time server; and
   using the second timestamp log file to normalize the second values of the second local time to the corresponding values of the common time source for comparison with the first plurality RF data.

7. The method of claim 1 further comprising:
   connecting the first RF data collection device to the second RF collection device;
   receiving the initial value of the common time source at the first RF data collection device from the second RF data collection device, wherein the common time source includes a second local time of the second RF data collection device;
   maintaining a connection between the first RF data collection device and the second RF collection device for a predetermined time period and periodically comparing a current value of the first local time to a current value of the common time source during the predetermined time period; and
   when the current value of the first local time fails to match the current value of the common time source, recording offset amounts therebetween in the first timestamp log file.

8. The method of claim 7 further comprising:
   pairing the first RF data collection device with the second RF collection device; and
   periodically receiving the current value of the common time source at the first RF data collection device from the second RF data collection device.

9. The method of claim 1 further comprising:
selecting a timing frequency for collecting the first plurality of RF data using a simple amplitude modulation of a local broadcast signal received at the first RF data collection device;
monitoring the timing frequency;
counting peaks of the local broadcast signal; and
generating the first timestamp log file by recording a current value of the first local time after N*1/X peaks of the local broadcast signal, where X is the timing frequency and N is a preconfigured multiplier selected to limit an impact of recording the current value of the first local time.

10. An RF data collection device comprising:
an RF transceiver device;
a memory device;
an internal clock that manages a first local time; and
a programmable processor,
wherein the programmable processor synchronizes the first local time to an initial value of a common time source,
wherein the programmable processor generates a timestamp log file documenting a propensity of the first local time to deviate from the common time source,
wherein the programmable processor saves the timestamp log file in the memory device,
wherein the RF transceiver device collects a first plurality of RF data from an RF network,
wherein the programmable processor records the first plurality of RF data in the memory device,
wherein the first plurality of RF data includes first values of the first local time at which corresponding RF signal components are recorded, and
wherein the timestamp log file is used to normalize the first values of the first local time to corresponding values of the common time source for comparison with a second plurality of RF data recorded by a second RF data collection device.

11. The RF data collection device of claim 10 wherein the RF transceiver device connects to a network time server using a network time protocol to synchronize the first local time to the common time source, wherein the network time server manages the common time source, wherein the RF transceiver device periodically connects to the network time server to compare a current value of the first local time to a current value of the common time source, and wherein, when the current value of the first local time fails to match the current value of the common time source, the programmable processor adds an entry to the timestamp log file that records offset amounts between the current value of the first local time and the current value of the common time source and increases a rate at which the RF transceiver device periodically connects to the network time server.

12. The RF data collection device of claim 11 wherein the programmable processor calculates time offsets for each interval period at which the corresponding RF signal components are recorded using a linear average of the offset amounts recorded in the timestamp log file for an adjustable elapsed time period.

13. The RF data collection device of claim 11 wherein the RF transceiver device receives a meta data collection file that includes configuration information for the RF network and an identification of the network time server, wherein the programmable processor identifies the network time server from the meta data collection file, and wherein the programmable processor uses the configuration information to collect and record the first plurality of RF data.

14. The RF data collection device of claim 13 wherein the configuration information includes frequencies, bands, or channels of the RF network, a recording bandwidth, or a recording data rate.

15. The RF data collection device of claim 10 wherein the RF transceiver device connects to the second RF collection device and receives the initial value of the common time source from the second RF data collection device, wherein the common time source includes a second local time of the second RF data collection device, wherein the RF transceiver device maintains a connection with the second RF collection device for a predetermined time period, wherein the programmable processor periodically compares a current value of the first local time to a current value of the common time source during the predetermined time period, and wherein, when the current value of the first local time fails to match the current value of the common time source, the programmable processor records offset amounts therebetween in the timestamp log file.

16. The RF data collection device of claim 15 wherein the RF transceiver device pairs with the second RF collection device, and wherein the first RF transceiver device periodically receives the current value of the common time source from the second RF collection device.

17. The RF data collection device of claim 10 wherein the programmable processor selects a timing frequency for collecting the first plurality of RF data using a simple amplitude modulation of a local broadcast signal received by the RF transceiver device, monitors the timing frequency, counts peaks of the local broadcast signal, and generates the timestamp log file by recording a current value of the first local time after N*1/X peaks of the local broadcast signal, and wherein X is the timing frequency and N is a preconfigured multiplier selected to limit an impact of recording the current value of the first local time.

18. A system comprising:
a first RF data collection device; and
a second RF data collection device,
wherein the first RF data collection device synchronizes a first local time of the first RF data collection device to an initial value of a common time source,
wherein the second RF data collection device synchronizes a second local time of the second RF data collection device to the initial value of the common time source,
wherein the first RF data collection device generates a first timestamp log file documenting a propensity of the first local time to deviate from the common time source,
wherein the second RF data collection device generates a second timestamp log file documenting a propensity of the second local time to deviate from the common time source,
wherein the first RF data collection device saves the first timestamp log file in a first memory device of the first RF data collection device,
wherein the second RF data collection device saves the second timestamp log file in a second memory device of the second RF data collection device,
wherein the first RF data collection device collects and records a first plurality of RF data from an RF network in the first memory device,
wherein the first plurality of RF data includes first values of the first local time at which corresponding first RF signal components are recorded, wherein the second RF data collection device collects and records a second plurality of RF data from the RF network in the second memory device, wherein the second plurality of RF data includes second values of the second local time at which corresponding second RF signal components are recorded, wherein the first timestamp log file is used to normalize the first values of the first local time to corresponding values of the common time source for comparison with the second plurality RF data, and wherein the second timestamp log file is used to normalize the second values of the second local time to the corresponding values of the common time source for comparison with the first plurality of RF data.

19. The system of claim 18 wherein the first RF data collection device connects to a network time server using a network time protocol to synchronize the first local time to the common time source, wherein the network time server manages the common time source, wherein the first RF data collection device periodically connects to the network time server to compare a current value of the first local time to a current value of the common time source, wherein, when the current value of the first local time fails to match the current value of the common time source, the first RF data collection device adds an entry to the first timestamp log file that records offset amounts between the current value of the first local time and the current value of the common time source and increases a rate at which the first RF data collection device periodically connects to the network time server, wherein the second RF data collection device connects to the network time server using the network time protocol to synchronize the second local time to the common time source, wherein the second RF data collection device periodically connects to the network time server to compare a current value of the second local time to the current value of the common time source, and wherein, when the current value of the second local time fails to match the current value of the common time source, the second RF data collection device adds an entry to the second timestamp log file that records offset amounts between the current value of the second local time and the current value of the common time source and increases a rate at which the second RF data collection device periodically connects to the network time server.

20. The system of claim 18 wherein the first RF data collection device connects to the second RF collection device, wherein the first RF data collection device receives the initial value of the common time source from the second RF data collection device, wherein the common time source includes the second local time, wherein the first RF data collection device maintains a connection with the second RF collection device for a predetermined time period and periodically compares a current value of the first local time to a current value of the common time source during the predetermined time period, and wherein, when the current value of the first local time fails to match the current value of the common time source, the first RF data collection device records offset amounts therebetween in the first timestamp log file.

* * * * *